Sept. 29, 1942. H. HORNSCHUCH 2,297,302
SEALING DEVICE
Filed June 22, 1940
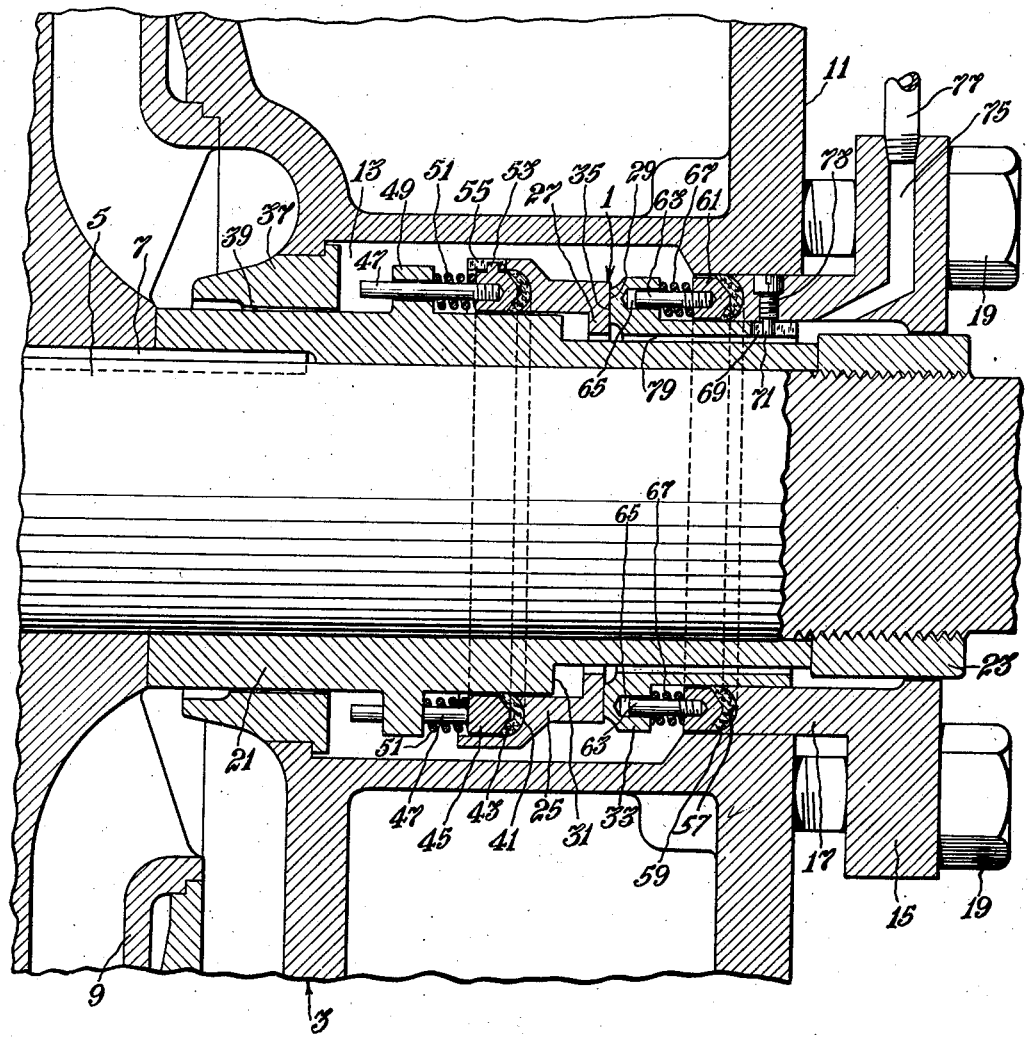
INVENTOR
Hanns Hornschuch
BY
HIS ATTORNEY Patented Sept. 29, 1942

2,297,302

UNITED STATES PATENT OFFICE 2,297,302

SEALING DEVICE

Hanns Hornschuch, Easton, Pa., assignor to Ingersoll-Rand Company, New York, N. Y., a corporation of New Jersey Application June 22, 1940, Serial No. 341,843

2 Claims. (Cl. 286—7)

This invention relates to a sealing device and, more particularly, to a seal adapted for use with a centrifugal pump and the like.

The seal of the present invention comprises a pair of sealing members, movable longitudinally with respect to each other, which cooperate to valve a small amount of liquid therebetween to lubricate the sealing surfaces as one sealing member rotates with respect to the other. Ordinarily, the seal is arranged in the chamber intended to be sealed and, in order to retard the escape of liquid through the space between the sealing surfaces, the sealing members coact with the pump rotor to define a sealing fluid chamber to which sealing fluid is supplied.

In order to seal these two chambers from each other and prevent leakage of all liquid from the chamber to be sealed, except through the desired channel, spring-pressed plastic sealing elements are employed. The springs acting against the plastic elements are so arranged that they also serve to hold the sealing members in sealing relationship.

In such an arrangement there may be wear of the sealing members and, since the members are movable longitudinally with respect to each other, occasions will arise when the plastic sealing elements will also become worn. Such wear must be compensated for and, accordingly, it is an object of the present invention to provide a sealing device wherein the component seals may be adjusted without disassembly of the seal.

It is another object to provide a sealing device wherein the sealing liquid can only escape through a predetermined channel to lubricate the sealing surfaces.

Another object is to provide a sealing device wherein the springs normally take up the wear of the sealing surfaces and external means are employed to compensate for excessive wear.

A further object is to provide a sealing device which is simple in construction yet strong and durable, which will effectively seal liquid in the pump and in which perfect alignment of the sealing surfaces is unnecessary.

These and other objects will be apparent from the following description of which the drawing forms a part and wherein the device of the present invention is shown as applied to a centrifugal pump.

In the drawing, the sealing device, generally indicated at 1, is shown as applied to a pump, generally indicated at 3. The pump, being a centrifugal pump, comprises a shaft 5 to which is keyed, by key 7, an impeller 9. The impeller 9, as shown, is an initial stage impeller and, consequently, the impeller chamber is subjected to the inlet pressure of the fluid pumped.

Loosely surrounding the end of shaft 5 is a stuffing box 11. The outer end of the bore, or chamber, 13 formed in the stuffing box is closed by a supporting member, or cover plate, 15, having an annular skirt 17, extending into the chamber 13. The cover 15 is adjustably secured on the stuffing box 11 by bolts 19 and by this means the distance the skirt 17 extends into the chamber 13 may be controlled by moving the cover toward or away from the stuffing box.

On the portion of the shaft 5, seating against the impeller 9 and extending into chamber 13, is a sleeve 21 which is secured to the shaft by the key 7. A nut 23 is threaded on the shaft so that it lies within the bore of the cover 15 and presses the sleeve 21 firmly against the impeller 9.

Within the chamber 13 is an annular sealing member 25 provided with a flange 27 on which is a sealing surface 29. This member surrounds and is spaced from the sleeve 21 at a point near the shoulder 31 which is formed on the sleeve.

A second annular sealing member 33, bearing on the skirt 17 and spaced from the sleeve 21, has a sealing surface 35 which cooperates with the surface 29 to effect a seal for chamber 13 and through which sufficient fluid may be valved to lubricate the surfaces and prevent excessive wear.

Near the impeller 9 and mounted on the stuffing box 11 is a spacer 37 which defines an annular passage 39 from the impeller chamber to the chamber 13. By means of this passage, fluid at the initial pressure of the pump may be introduced into the chamber 13 thus subjecting the sealing members to the initial pump pressure.

It will be noted that the annular sealing member 25 is designed to move longitudinally with respect to the sleeve 21 and to this end a concave surface 41 is provided on the member 25. This concave surface acts as a seat for a plastic packing cup ring 43 which is pressed thereagainst by the plunger ring 45 having stems 47.

The stems 47 extend through appropriate bores, provided in the flange 49, formed on the sleeve 21. Interposed between the flange 49 and the plunger ring 45 are springs 51 to constantly urge the plunger ring 45 against the packing ring 43 to hold it against the surface 41. The packing ring 43 is considerably larger than the surface 41 and, consequently, a portion thereof is pressed into sealing engagement with the sleeve 21 and thus effects a seal between the annular member 25 and the sleeve 21 to prevent escape of fluid from chamber 13 therebetween.

The plunger ring 45 extends completely around the sleeve 21 and any desired number of stems 47 and springs 51 may be employed to hold the packing ring 43 securely in place, although only two have been shown in the drawing. Likewise, a series of lugs 53, corresponding in number to the number of stems 47 and springs 51 provided, are formed on the plunger ring 45 which extend into slots 55 formed in the outer wall of the annular member 25.

Since the sleeve 21 is keyed to the shaft 5, the sleeve will rotate with the rotor and, likewise, the stems 47, springs 51, the plunger ring 45 and the packing ring 43 will also rotate. Consequently, the annular member 25 should be rotated and to this end the lugs 53 are provided. The lugs 53 and slots 55 thus cooperate to rotate the sealing member 25 and, at the same time, they limit the longitudinal movement of the plunger ring 45 toward the concave surface 41.

A similar arrangement is employed to seal the space between annular sealing member 33 and the skirt 17 and the space between the skirt 17 and the stuffing box 11. In this instance, a surface 57, also concave in contour, is formed on the skirt 17 in which rests another plastic cup packing ring 59. A second plunger ring 61, having stems 63 extending into the bores 65 provided in the annular sealing member 33, is held against the plastic packing cup ring 59 by springs 67 encircling stems 63 and compressed between the plunger ring 61 and the annular sealing member 33. Normally, the springs 67 not only act to hold the plunger ring 61 against the plastic cup packing ring 59 but also to urge sealing surface 35 into sealing engagement with the sealing surface 29.

The annular sealing member 33 has slots 69, corresponding in shape to the slots 55 in the annular sealing member 25, into which extend pins 71. The pins 71 are formed on screws 73 threadedly engaging the skirt 17. The pins 71 and slots 69 serve to limit the movement of the annular sealing member 33 away from the annular sealing member 25 and also prevent rotation of the annular sealing member 33 with respect to the skirt 17 which might be induced by the rotation of the annular sealing member 25. In this construction also any desirable number of stems 63, springs 67, pins 71 and slots 69 may be employed.

In the cover 15 is a bore, or conduit, 75 connected to the pipe 77 through which sealing fluid may be supplied. Ordinarily, any liquid passing between the sealing surfaces 29 and 35 would pass through the annular space 79 between the annular sealing member 33 and the sleeve 21 and escape. In order to prevent this and minimize the flow of liquid through the seal, a smothering fluid is introduced through bore 75 which communicates with the space 79.

It will thus be seen that a seal has been provided in which separate springs 51 and 67 hold the annular sealing members 25 and 33 in sealing engagement and also act to hold the packing rings 41 and 59 in sealing engagement. When the sealing members or packing rings become worn, the wear may be taken up by adjusting the distance that the skirt 17 extends into the stuffing box 11, by moving the cover 15 in towards the casing. Thus, a simple and efficient method of providing an effective seal at all times is assured and adjustments may be made without disassembly of the seal or pump.

I claim:

1. A sealing device for a rotary shaft including a sleeve on the shaft having a shoulder, a ring shaped sealing member fitting closely the larger diameter of the sleeve and sealed thereat, having an inwardly extending flange at the shoulder, a second sealing member about the sleeve, both said sealing members having cooperating sealing and bearing end surfaces and being adapted to move longitudinally with respect to the shaft, and individual resilient means for the sealing members acting in opposition to each other to actuate the said members endwise of the shaft for holding said end surfaces in contact.

2. A sealing device for a rotary shaft including a sleeve on the shaft having a shoulder, a ring shaped sealing member fitting closely the larger diameter of the sleeve and having an inwardly extending flange at the shoulder, a means to seal said member including a packing ring, a gland to compress the packing, springs bearing against the gland, and means to couple the sleeve with said member, a second sealing member about the sleeve, both said sealing members having cooperating sealing and bearing end surfaces, and individual resilient means for the sealing members acting in opposition to each other to actuate the said members endwise of the shaft for holding said end surfaces in contact.

HANNS HORNSCHUCH.